United States Patent
Ahmed et al.

(10) Patent No.: US 12,423,478 B2
(45) Date of Patent: Sep. 23, 2025

(54) VALIDATION OF COMPONENT TRANSFERS BETWEEN INFORMATION HANDLING SYSTEMS

(71) Applicant: Dell Products, L.P., Round Rock, TX (US)

(72) Inventors: A Anis Ahmed, Bangalore (IN); Jason Matthew Young, Round Rock, TX (US); Balakrishna Padhy, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 147 days.

(21) Appl. No.: 18/509,533

(22) Filed: Nov. 15, 2023

(65) Prior Publication Data
US 2025/0156587 A1    May 15, 2025

(51) Int. Cl.
*G06F 21/73* (2013.01)
*G06F 21/33* (2013.01)
*G06F 21/45* (2013.01)

(52) U.S. Cl.
CPC .............. *G06F 21/73* (2013.01); *G06F 21/33* (2013.01); *G06F 21/45* (2013.01)

(58) Field of Classification Search
CPC ........... G06F 21/73; G06F 21/33; G06F 21/45
See application file for complete search history.

(56) References Cited

U.S. PATENT DOCUMENTS

| | | | |
|---|---|---|---|
| 2022/0207185 A1* | 6/2022 | Young | H04L 9/3247 |
| 2022/0207186 A1* | 6/2022 | Young | G06F 21/64 |
| 2022/0207463 A1* | 6/2022 | Young | G06F 21/575 |

* cited by examiner

Primary Examiner — Amie C. Lin
(74) Attorney, Agent, or Firm — Fogarty LLP

(57) ABSTRACT

Systems and methods are provided for validation of the transfer of hardware components between two different IHSs (Information Handling Systems). During factory provisioning of the two IHSs, a factory-signed inventory certificate is uploaded to each IHS that identifies factory-installed hardware of the respective IHS. This inventory certificate is used to validate that the detected hardware of each IHS is genuine factory-installed hardware. When a discrepancy is detected during these validations, each IHS notifies a certificate management system. If the certificate management system receives discrepancy notifications from two IHSs that correspond to an authorized transfer of hardware components between these IHSs, delta certificates are generated for use by each IHS in validating these changes to the factory-installed hardware in each respective IHS.

20 Claims, 8 Drawing Sheets

VALIDATION OF COMPONENT TRANSFERS BETWEEN INFORMATION HANDLING SYSTEMS

CROSS REFERENCE TO RELATED APPLICATIONS

Related subject matter is contained in co-pending U.S. patent application Ser. No. 18/512,108, entitled "Validated Movement of Hardware within an IHS Cluster," filed on Nov. 17, 2023, the disclosure of which is hereby incorporated by reference.

FIELD

The present disclosure relates generally to Information Handling Systems (IHSs), and relates more particularly to supporting secure modifications to IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations and capabilities of any individual server in the data center. Moreover, administration of such large groups of servers may require teams of remote and local administrators working in shifts in order to support around-the-clock availability of the data center operations, while also minimizing any downtime. Each server IHS within a data center may support a wide variety of possible hardware and software configurations. For instance, each individual server IHS may be manufactured accordingly to customized hardware and software configurations requested by a customer. Once an IHS has been received and deployed, a customer may make modifications to the hardware and software of the IHS in order to adapt it for a particular computing task or a particular physical environment. In a data center environment, hardware components may be switched between IHSs, such as between rack-mounted servers.

SUMMARY

In various embodiments, systems and methods may include a first IHS (Information Handling System) configured to: validate detected hardware of the first IHS as factory-installed hardware based on an inventory specified in a first factory-provisioned inventory certificate stored to a memory of the first IHS; and notify a certificate management system when the validation identifies a discrepancy in the detected hardware of the first IHS from the factory-installed hardware. The systems and methods may also include a second IHS configured to: validate detected hardware of the second IHS as factory-installed hardware based on an inventory specified in a second factory-provisioned inventory certificate stored to a memory of the second IHS; and notify the certificate management system when the validation identifies a discrepancy in the detected hardware of the second IHS from the factory-installed hardware. The systems and methods may also include the certificate management system configured to: detect when the discrepancy in the detected hardware of the first IHS and the discrepancy in the detected hardware of the second IHS corresponds to a transfer of hardware between the first IHS and the second IHS; and when the transfer of hardware is determined, authorize the generation of delta certificates for validation of the transfer between the first IHS and the second IHS.

In some embodiments, the discrepancy in the detected hardware of the first IHS from the factory-installed hardware comprises a missing factory-installed hardware component of the first IHS that was not detected. In some embodiments, the discrepancy in the detected hardware of the second IHS from the factory-installed hardware comprises an unrecognized hardware component that is not a factory-installed hardware component of the second IHS. In some embodiments, the detection of discrepancies as corresponding to the transfer of hardware between the first IHS and the second IHS comprises determining the missing factory-installed hardware component of the first IHS is the unrecognized hardware component that is not a factory-installed hardware component of the second IHS. In some embodiments, the certificate management system is configured to block generation of the delta certificates without determining the discrepancy in the detected hardware of the first IHS and the discrepancy in the detected hardware of the second IHS corresponds to the transfer of hardware between the first IHS and the second IHS. In some embodiments, the first IHS is configured to prevent further booting of the IHS upon notifying the certificate management system of the discrepancy in the detected hardware of the first IHS until a delta certificate is generated for use in validating this discrepancy in the detected hardware of the first IHS. In some embodiments, the first factory-provisioned inventory certificate is stored to a persistent memory of the first IHS during the factory-provisioning of the first IHS and wherein the second factory-provisioned inventory certificate is stored to a persistent memory of the second IHS during the factory-provisioning of the second IHS. In some embodiments, the certificate management system is further configured to defer action on the notification of the discrepancy in the detected hardware of the first IHS for a predetermined interval. In some embodiments, after the predetermined interval, the certificate management system requests authorization from an administrator for the notified discrepancy in the detected hardware of the first IHS, and wherein the certificate management system generates a delta certificate for validating the discrepancy in the detected hardware of the first IHS.

The system of claim 8, wherein during the predetermined interval, the certificate management monitors for a notification of a corresponding discrepancy reported by another IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
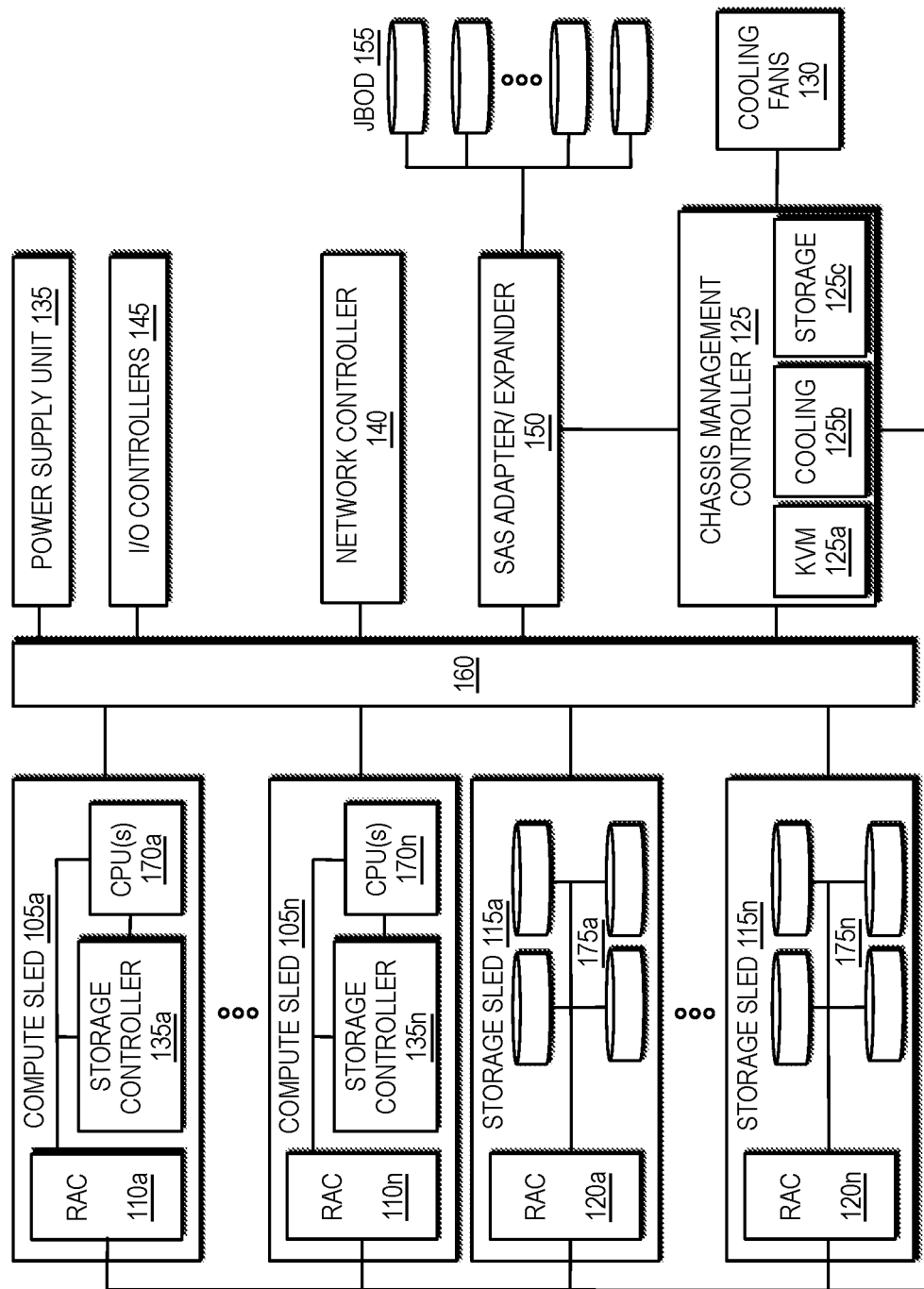
FIG. 1 is a diagram illustrating certain components of a chassis, according to some embodiments, for supporting validation of the transfer of hardware components between different chassis.

FIG. 1 is a block diagram illustrating certain components of a chassis 100 comprising one or more compute sleds 105a-n and one or more storage sleds 115a-n that may be configured to implement the systems and methods described herein for supporting validation of the transfer of hardware components between different chassis 100. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery of an chassis 100, the chassis and/or individual IHS sleds installed in the chassis 100, may be modified by replacing various hardware components or by installing new hardware components.

As described in additional detail below, chassis 100 may include capabilities that allow a customer to validate that hardware detected in chassis 100 is the same factory installed and provisioned hardware that was supplied to the customer. In addition, embodiments support secure modifications to chassis 100, such as by an designated administrator that receives the IHS from the manufacturer and may perform hardware customizations to support the requirements of a specific deployment. Over time, administrators may continue to perform customizations to the hardware of chassis 100. In some instances, these administrative operations may involvement movement of hardware components from chassis 100 to another chassis that is also configured according to embodiments. Embodiments supports secure transfer for hardware components from one chassis 100 to another, such as in scenarios where individual IHS sleds (e.g., compute sleds 105a-n and storage sleds 115a-n) or other swappable hardware of chassis, are moved between chassis.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100. Embodiments may further support secure transfer of backplane 160 between chassis 100 and another chassis configured according to embodiments.

Figure 2:
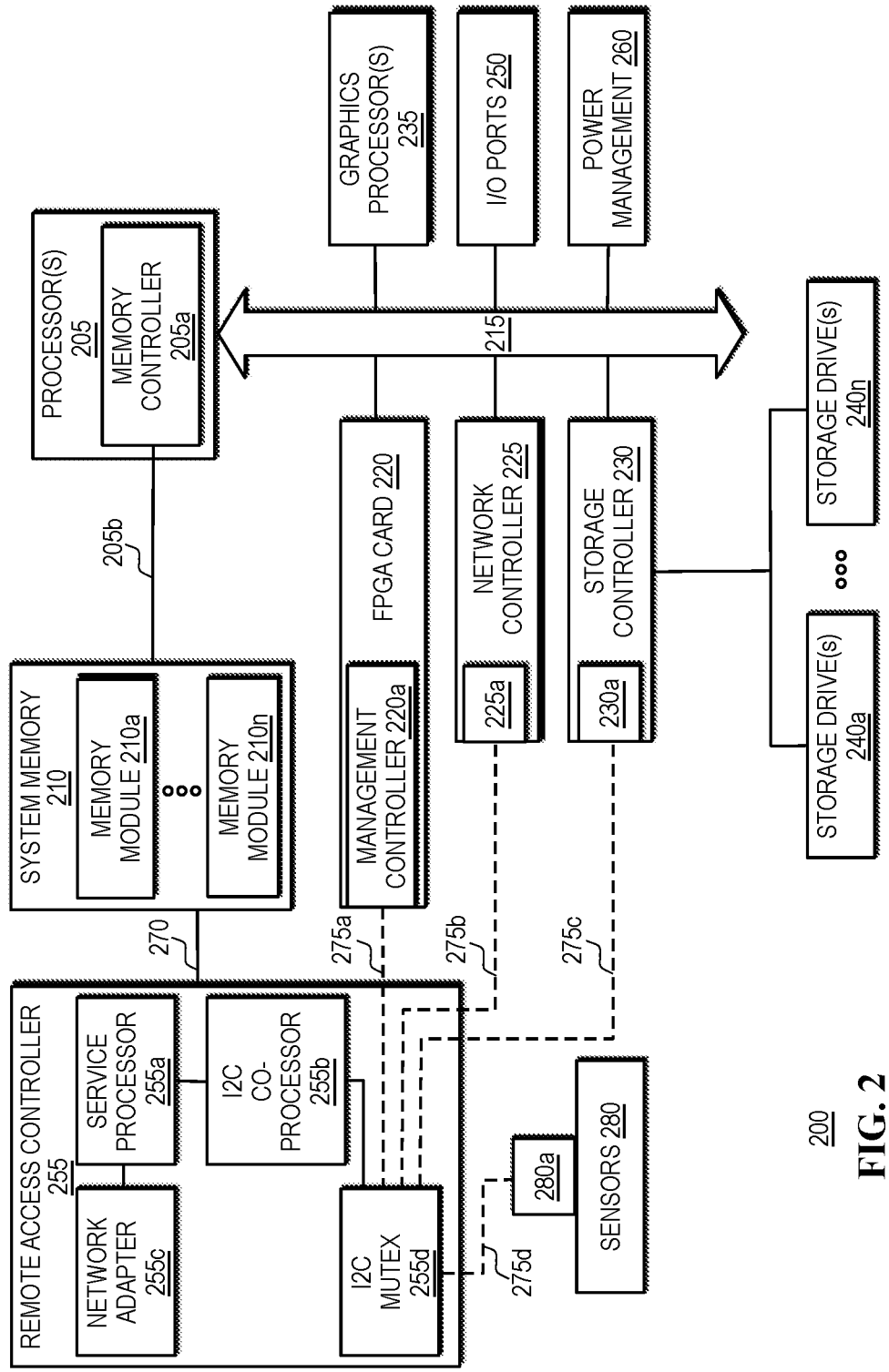
FIG. 2 is a diagram illustrating certain components of an IHS configured, according to some embodiments, for supporting the validation of the transfer of hardware components between the IHS and another IHS configured according to embodiments.

In certain embodiments, a compute sled 105*a-n* may be an IHS such as described with regard to IHS 200 of FIG. 2. A compute sled 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications with various components of a compute sled 105*a-n* and chassis 100. Remote access controllers 110*a-n* may collect various types of sensor data, such as collecting temperature sensor readings that are used in support of airflow cooling of the chassis 100 and the sleds 105*a-n*, 115*a-n*. In addition, each remote access controller 110*a-n* may implement various monitoring and administrative functions related to compute sleds 105*a-n* that utilize sideband bus connections with various internal components of the respective compute sleds 105*a-n*.

In some embodiments, each compute sled 105*a-n* installed in chassis 100 may be uniquely identified based on a code or other identifier that may be permanently encoded in a non-volatile memory of a respective compute sled 105*a-n* by its manufacturer. As described below, during a provisioning phase of the factory assembly of chassis 100, a signed certificate that specifies hardware components of chassis 100, such as through such identifiers of compute sleds 105*a-n*, that were installed during its manufacture may be stored in a non-volatile memory accessed by a remote access controller 110*a-n* of a compute sled 105*a-n*. Using this signed inventory certificate, a customer may validate that the hardware components of chassis 100 are the same components that were installed at the factory during its manufacture. As described in additional detail below, embodiments may further support secure transfer of compute sleds 105*a-n* between chassis 100 and another chassis configured according to embodiments.

Each of the compute sleds 105*a-n* may include a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100. As described in additional detail below, embodiments may further support secure transfer of SAS expander 150 and/or individual storage drives 155 between chassis 100 and another chassis configured according to embodiments As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 115*a-n* may be utilized in various storage configurations by the compute sleds 105*a-n* that are coupled to chassis 100. As illustrated, each storage sled 115*a-n* includes a remote access controller (RAC) 120*a-n* provides capabilities for remote monitoring and management of respective storage sleds 115*a-n*. In some embodiments, each storage sled 115*a-n* may be uniquely identified based on a code or other identifier that may be permanently encoded in a non-volatile memory of the respective storage sled 115*a-n* by its manufacturer. As described below, embodiments support validation of each storage sled 115*a-n* as being a storage sled that was installed at the factory during the manufacture of chassis 100. As described in additional detail below, embodiments may further support secure transfer of storage sleds 115*a-n* between chassis 100 and another chassis configured according to embodiments As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100. As described in additional detail below, embodiments may further support secure transfer of network controller 140 between chassis 100 and another chassis configured according to embodiments.

Chassis 100 may similarly include one or more power supply units 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with multiple redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100. As described in additional detail below, embodiments may further support secure transfer of power supply unit 135 between chassis 100 and another chassis configured according to embodiments.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. As described in additional detail below, embodiments may further support secure transfer of I/O controller 140 between chassis 100 and another chassis configured according to embodiments.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100. As described in additional detail below, embodiments may further support secure transfer of chassis management controller 125 between chassis 100 and another chassis configured according to embodiments.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting the validation of the transfer of hardware components between the IHS 200 and another IHS configured according to embodiments. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200, and further support secure transfer of hardware of IHS 200 to another IHS configured according to embodiments. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

As described, an IHS 200 may be assembled and provisioned according to customized specifications provided by a customer. The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture, where these validations of the IHS hardware may be initially completed using a factory-provisioned inventory certificate.

As described in additional detail below, IHS 200 may include capabilities that allow a customer to validate that is hardware detected as installed IHS 200 is the same factory installed and provisioned hardware that was supplied to the customer. In addition, embodiments support secure modifications to IHS 200, such as by an administrator that receives a rack-mounted server from the manufacturer and performs hardware customizations to support the requirements of a specific deployment. In some instances, such customization may involve movement of hardware between the IHSs of the datacenter, such as to transfer a specialized graphics processor 235 for supporting artificial intelligence computations from another IHS in the datacenter that is been reconfigured. In other instances, general purpose hardware, such as commoditized identical storage drives, may be regularly swapped between datacenter IHSs. Embodiments supports secure transfer of hardware components to and/or from IHS 200 in such scenarios.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor (s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200. As described in additional detail below, embodiments may further support secure transfer of memory modules 210a-n between chassis 100 and another chassis configured according to embodiments.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200. As described in additional detail below, embodiments may further support secure transfer of FPGA card 220 between chassis 100 and another chassis configured according to embodiments.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200, or as being a trusted network controller installed by the customer. As described in additional detail below, embodiments may further support secure transfer of network controller 225 between chassis 100 and another chassis configured according to embodiments.

IHS 200 may include one or more storage controllers 230 that may be utilized to access storage drives 240*a-n* that are accessible via the chassis in which IHS 100 is installed. Storage controller 230 may provide support for RAID (Redundant Array of Independent Disks) configurations of logical and physical storage drives 240*a-n*. In some embodiments, storage controller 230 may be an HBA (Host Bus Adapter) that provide more limited capabilities in accessing physical storage drives 240*a-n*. In some embodiments, storage drives 240*a-n* may be replaceable, hot-swappable storage devices that are installed within bays provided by the chassis in which IHS 200 is installed. In embodiments where storage drives 240*a-n* are hot-swappable devices that are received by bays of chassis, the storage drives 240*a-n* may be coupled to IHS 200 via couplings between the bays of the chassis and a midplane of IHS 200. In some embodiments storage drives 240*a-n* may also be accessed by other IHSs that are also installed within the same chassis as IHS 100. Storage drives 240*a-n* may include SAS (Serial Attached SCSI) magnetic disk drives, SATA (Serial Advanced Technology Attachment) magnetic disk drives, solid-state drives (SSDs) and other types of storage drives in various combinations.

In some embodiments, each individual storage controller 230 and storage drive 240*a-n* may be uniquely identified based on a code or other identifier that may be permanently encoded in a non-volatile memory of the component by its manufacturer. As described below, embodiments support validation of storage controller 230 and storage drives 240*a-n* as being the same storage controller and storage drives that were installed at the factory during the manufacture of IHS 200. As described in additional detail below, embodiments may further support secure transfer of storage drives 240*a-n* between chassis 100 and another chassis configured according to embodiments.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200, and may further support secure transfer of these components between chassis 100 and another chassis configured according to embodiments.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200. As described in additional detail below, embodiments may further support secure transfer of hardware components of IHS 200 that are managed by remote access controller 255 to another IHS that is also configured according to embodiments.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
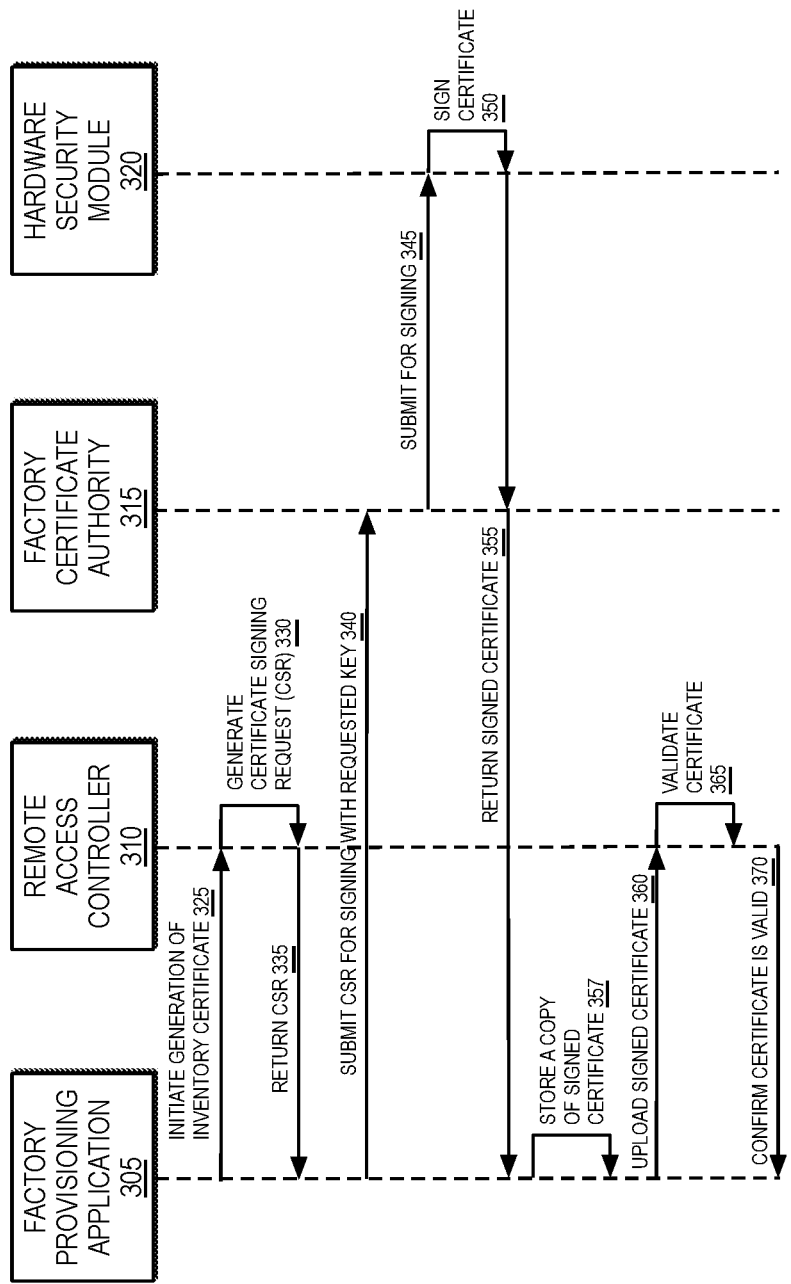
FIG. 3 is a swim lane diagram illustrating certain responsibilities of components of a system configured according to certain embodiments for factory provisioning of an IHS in a manner that supports the validation of the transfer of hardware components between different IHSs.
Figure 4:
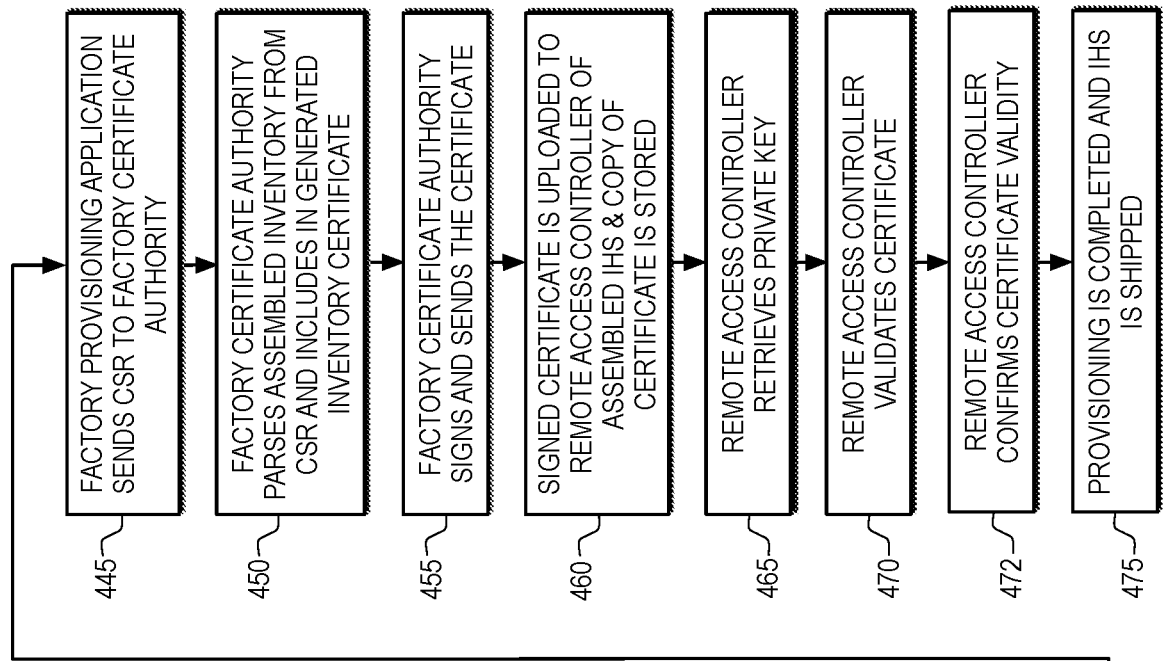
FIG. 4 is a flowchart describing certain steps of a method, according to some embodiments, for assembly and provisioning of an IHS in a manner that supports the validation of the transfer of hardware components between different IHSs.
Figure 4:
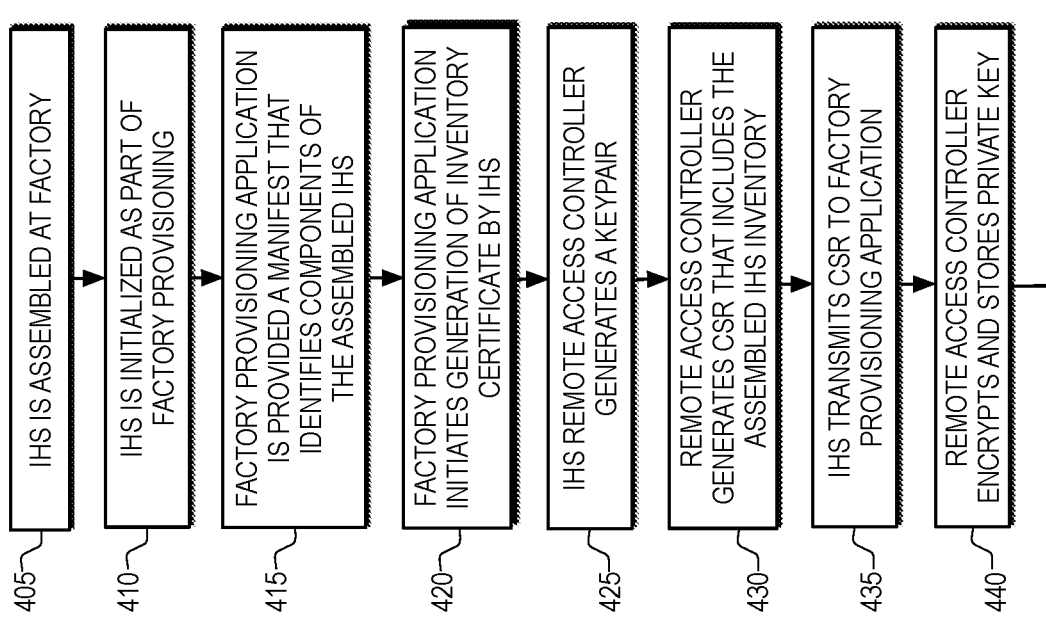

FIG. 3 is a swim lane diagram illustrating certain responsibilities of components of a system configured according to certain embodiments for factory provisioning of an IHS in a manner that supports secure transfer of hardware components between IHSs that are configured according to embodiments. FIG. 4 are a flowchart describing certain steps of a method, according to some embodiments, for factory provisioning of an IHS in a manner that supports secure transfer of hardware components between IHSs that are configured according to embodiments. Some embodiments of the method of FIG. 4 may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 415, a manifest generated during assembly of an IHS is provided to the factory provisioning application 305 that is being used to provision the assembled IHS. Based on this hardware manifest information, at block 420, the factory provisioning application 305 may also initiate the generation of an inventory certificate that may be used to validate that the detected hardware components of the IHS are the same hardware components that were installed during the factory assembly of the IHS. As described in additional detail below, validation of the IHS hardware as factory installed using a factory-provisioned inventory certificate may be extended through the use of a delta certificates that can be used to validate any modifications to the factory installed hardware of the IHS. In embodiments, the generation of delta certificates used to validate modifications may be initiated based on a certificate management system detecting corresponding validation failures reported by two or more IHSs that are factory provisioned in this manner.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS. The factory installed hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS. As part of generating the inventory certificate, the factory certificate authority may utilize the public key included in the CSR to generate a cryptographic challenge that establishes the remote access controller's 310 possession of the private key that corresponds to this public key.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once it has been shipped and has been deployed by a customer. Once the IHS is deployed, embodiments may be utilized to augment this factory-provisioned inventory certificate with one or more delta certificates that each specify modifications to the factory-installed hardware of the IHS, such as in transferring hardware components from one IHS to another, such as in a data center environment.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the private key from the generated keypair, at block 470, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 472, the remote access controller confirms that the inventory included in the signed inventory certificate is valid and, at 370, the remote access controller 310 confirms the validity of the inventory certificate with a notification to the factory provisioning application 305.

With the generation and validation of the signed inventory certificate completed, embodiments continue, additional factory provisioning of the assembled IHS may be completed and, at block 475, the assembled IHS may be shipped from the factory to a customer, or to a location or individual designated by the customer. As described, once an IHS has been delivered, it may be modified over time to support particular computing tasks, such as to support a specific artificial intelligence or data storage system. In a data center environment, these modifications may involve movement of hardware components between IHSs, such as rack-mounted servers. For instance, data storage drives may be occasionally moved between servers, such as to support increased computational loads that are to be supported by a particular server, where such increases may be specified via new SLA (Service-Level Agreements) that are to be supported by this server. Accordingly, an IHS according to embodiments is expected to be modified once it has been delivered and deployed by the customer for which the IHS is being manufactured and provisioned. Embodiments thus support capabilities that support secure transfer of modifications to the factory-installed hardware of the IHS, where modifications include movement of hardware components between IHSs.

Figure 5:
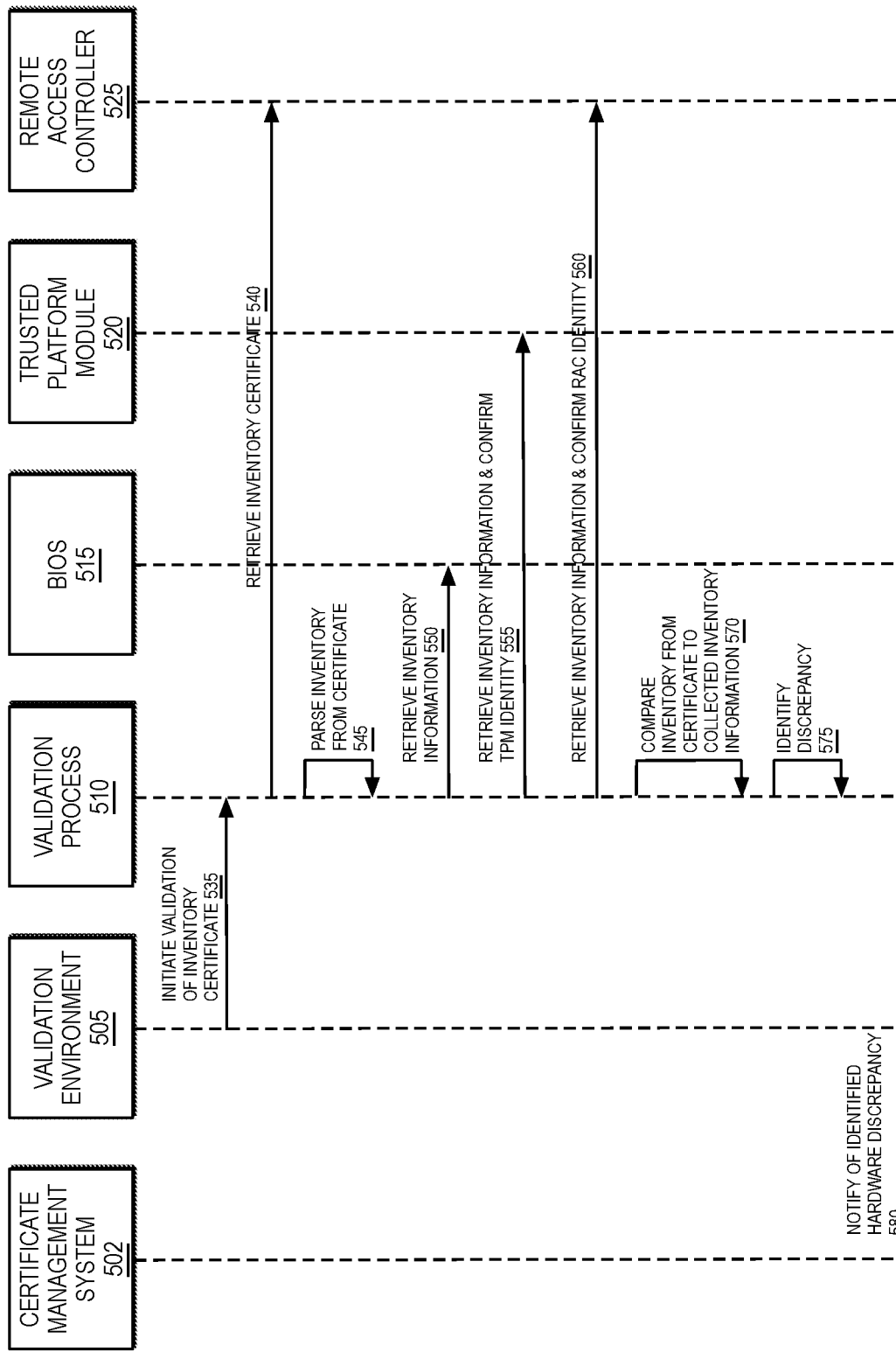
FIG. 5 is a swim lane diagram illustrating certain responsibilities of components of an system configured according to certain embodiments for the validation of the transfer of hardware components between different IHSs.
Figure 6A:
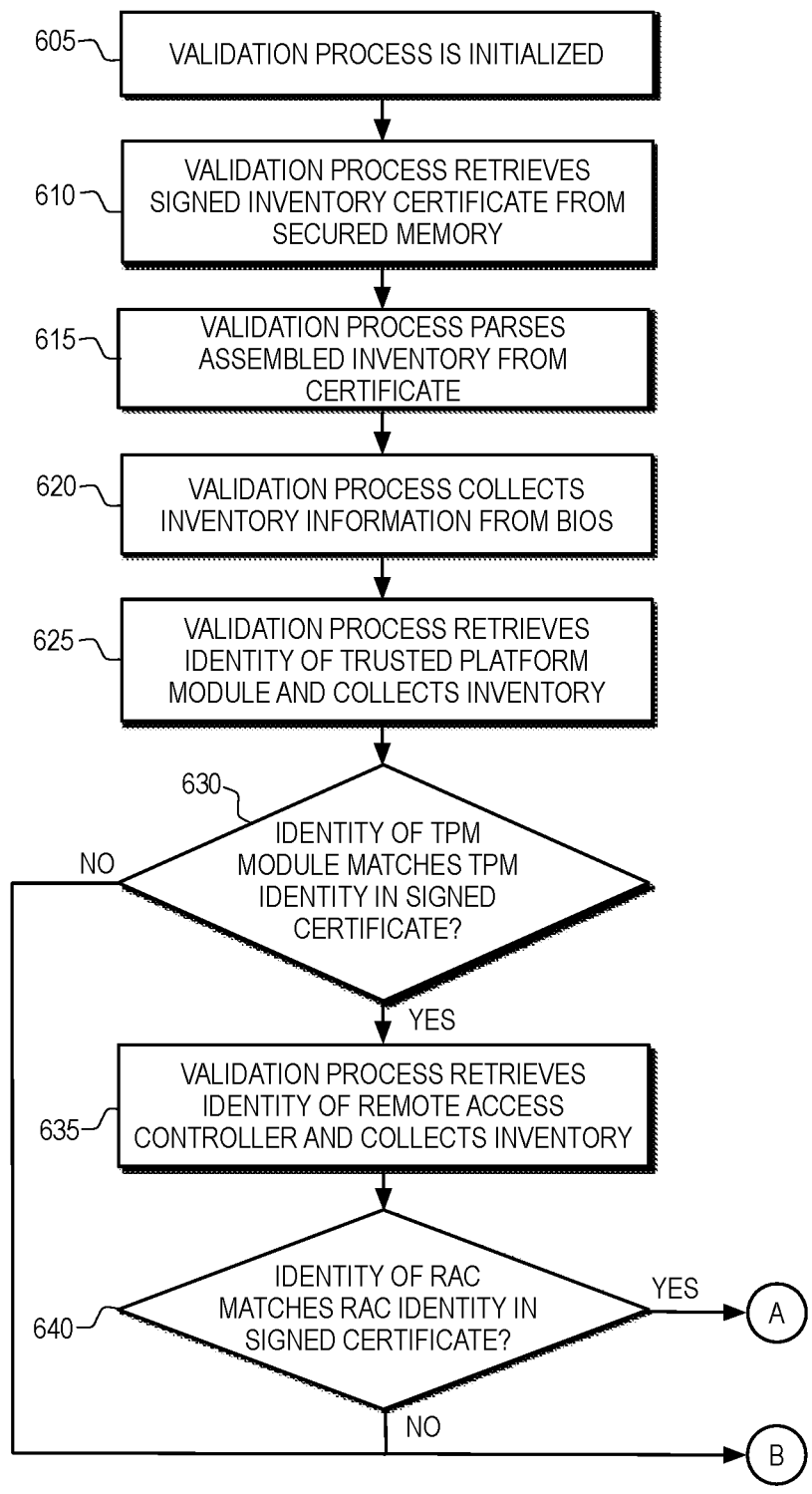
FIG. 6A is a flowchart describing certain steps of a method, according to some embodiments, for validation of the transfer of hardware components between different IHSs.
Figure 6B:
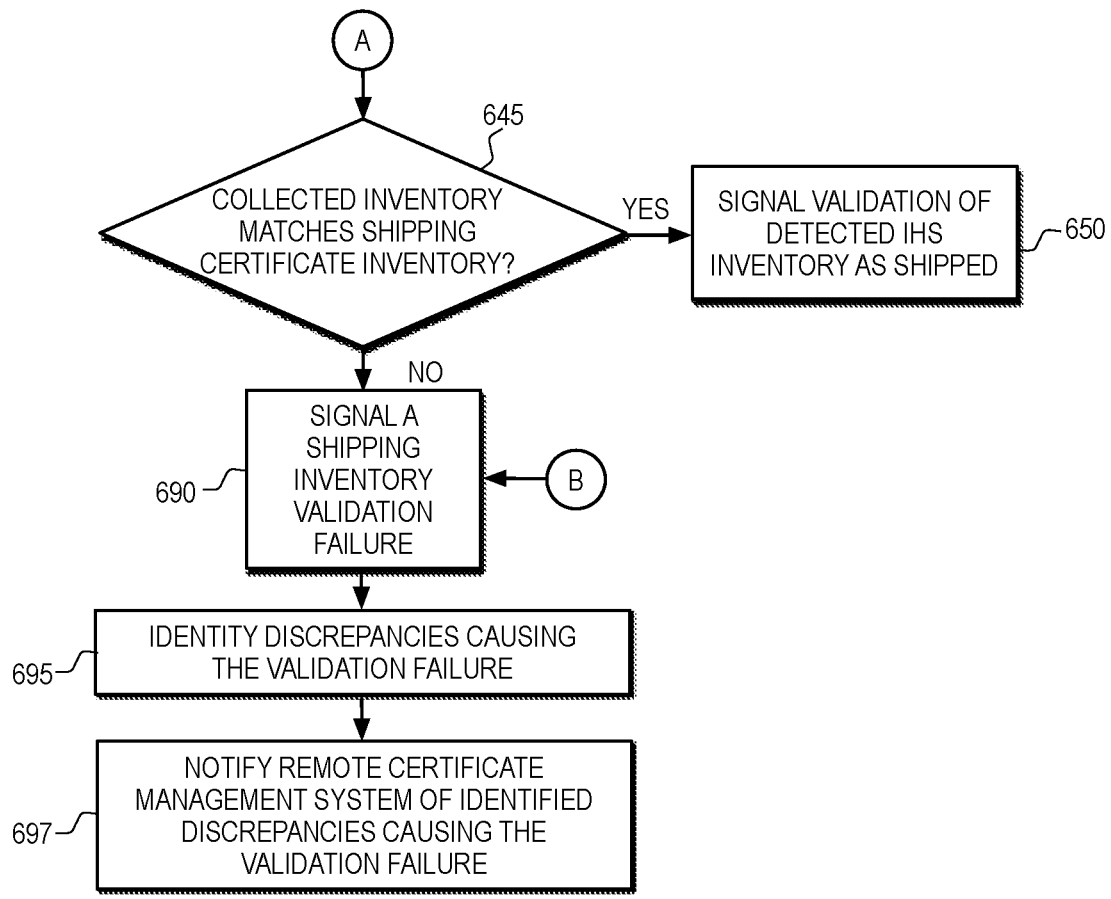
FIG. 6B is a continuation of the flowchart of FIG. 6A.

FIG. 5 is a swim lane diagram illustrating certain responsibilities of components of an IHS configured according to certain embodiments for use of an inventory certificate in the validation of the hardware components of the IHS and the validation of the transfer of hardware components between different IHSs. FIGS. 6A and 6B are a flowchart describing certain steps of a method, according to some embodiments, for use of an inventory certificate in the validation of the hardware components of the IHS and for validation of the transfer of hardware components between different IHSs. Embodiments may begin with the delivery of an IHS where the IHS has been assembled and provisioned according to the procedures set forth above. In particular, the delivered IHS has been provisioned at the factory to include a signed inventory certificate that specifies the factory installed hardware components of the IHS.

Upon receiving an IHS configured in this manner, the IHS may be unpacked, assembled and initialized by an administrator. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning. In some instances, this provisioning of the IHS for use within a data center may include an administrator first ensuring that the IHS has been received with only factory-installed hardware.

At block 605, the IHS has been powered and a validation environment 505 that includes a validation process 510 is initialized. In some instances, the validation process 510 may be initialized as part of the initial provisioning of an IHS by a customer. In other instances, the validation process may be initialized by an administrator as part of an onboarding procedure for incorporating an IHS into data center operations, such as upon the IHS being moved to a new location. In some embodiments, the validation process may run within a pre-boot environment, such as a PXE (Preboot execution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller 525 of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 610 and as indicated at 540, the inventory certificate validation process 510 retrieves the signed inventory certificate from the remote access controller 525, or from a persistent memory of the IHS. As described above, the factory provisioning process may include uploading a signed original inventory certificate to the remote access controller or to a persistent memory of the IHS. At block 615 and at 545, the inventory certificate validation process 510 parses the hardware inventory information from the signed inventory certificate. Using the public key provided in the signed inventory certificate, the inventory validation process 510 may confirm the integrity of the inventory information that is included in the signed inventory certificate, such as based on a challenge that confirms ownership of the corresponding private key by the remote access controller 525.

In some scenarios, the inventory certificate validation process 510 may commence by collecting an inventory of the detected hardware components of the IHS. In some instances, this collection of inventory information may be initiated earlier by the inventory certificate validation process, such as during initialization of the IHS. At block 620 and as indicated at 550, the inventory certificate validation process 510 may query the BIOS 515 of the IHS for an inventory of hardware components that have been detected by BIOS 515. At block 625 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 630, the validation process may confirm the identity of the detected TPM against the identity of the TPM reported in the signed inventory certificate. If the identity of the TPM is successfully validated, validation may continue at block 635. However, if the identity of the TPM is not validated, at block 690, the validation process may signal a core inventory validation failure since any discrepancies between the identity of the factory installed TPM and the TPM that has been detected signals a potential compromise in the root of trusted hardware components of the IHS.

At block 635 and as indicated at 560, the inventory certificate validation process 510 may retrieve additional hardware inventory and thermal information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. As with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 640, the validation process 510 may confirm the identity of the detected remote access controller against the identity of the remote access controller reported in the signed inventory certificate. If the remote access controller is successfully validated, validation may continue at block 645. Otherwise, if the identity of the remote access controller is not validated, at block 690, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

The validation process 510 may retrieve additional inventory information from any other available data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information of the detected components against the inventory information that is parsed from the signed inventory certificate. If the unique identifiers of the detected hardware components of the initialized IHS match the identifiers of the factory installed hardware components from the signed inventory certificate, at block 650 and 575, the inventory validation process 510 signals a successful validation of the detected hardware of the IHS as being factory-installed hardware, including providing notification of the successful validation to any administrator participating in the validation. The customer receiving delivery of the IHS is thus assured that the IHS is operating using only hardware components that were installed at the factory during manufacture of the IHS, with no missing or additional hardware components detected.

If any hardware components are detected that are not identified in the inventory from the certificate, at block 690, the validation process may signal an inventory validation failure. In some embodiments, an inventory validation failure will also be signaled if the validation process identifies is unable to detect components that are specified in the inventory certificate. In some embodiments, a validation failure may be signaled if factory-installed hardware components specified by the inventory certificate are not detected. In this manner, successful validation requires confirming that an IHS is operating using all of the factory-installed hardware, and no additional hardware.

As indicated in FIG. 5, if the hardware of the IHS is not validated as including only factory-installed hardware, embodiments may include notification of the detected discrepancy to a certificate management system 502. As described in additional detail below, the certificate management system 502 may be a cloud-based or other remote system used in managing cryptographic certificates used in the validation of the authenticity of hardware components of IHSs configured according to embodiments. In embodiments, the certificate management system 502 manages the generation of modifications to factory-provisioned inventory certificates for IHSs, such as the IHS 200 of FIG. 2, where these certificate modifications may be in the form of delta certificates that augment the validations provided by the factory-provisioned inventory certificate, such as to reflect an authorized modification to the hardware of an IHS.

As described, modifications to IHSs such as rack-mounted servers operating within a data center might result of movement of hardware components between servers of the data center. For instance, in a data center with a large number of IHSs that include swappable storage drives, these storage drives may be regularly moved between different IHSs as they are reconfigured and repurposed for new computing tasks. Such movement of commodity hardware between IHSs within the same data center presents limited risk but must nonetheless be validated as transfers of authentic components between IHSs that are both configured according to embodiments. As described in addition detail below, in order to validate these modifications, the certificate management system 502 generates delta certificates that can be used to confirm the authenticity of detected modifications to the factory-installed hardware of an IHS as being a result of a transfer of hardware within a data center. However, embodiments may restrict the generation of any such delta certificates by the certificate management system 502 may not be enabled until the initial validation of the hardware of the IHS as factory-installed is successfully completed for the first time and reported to the certificate management system 502.

Figure 7:
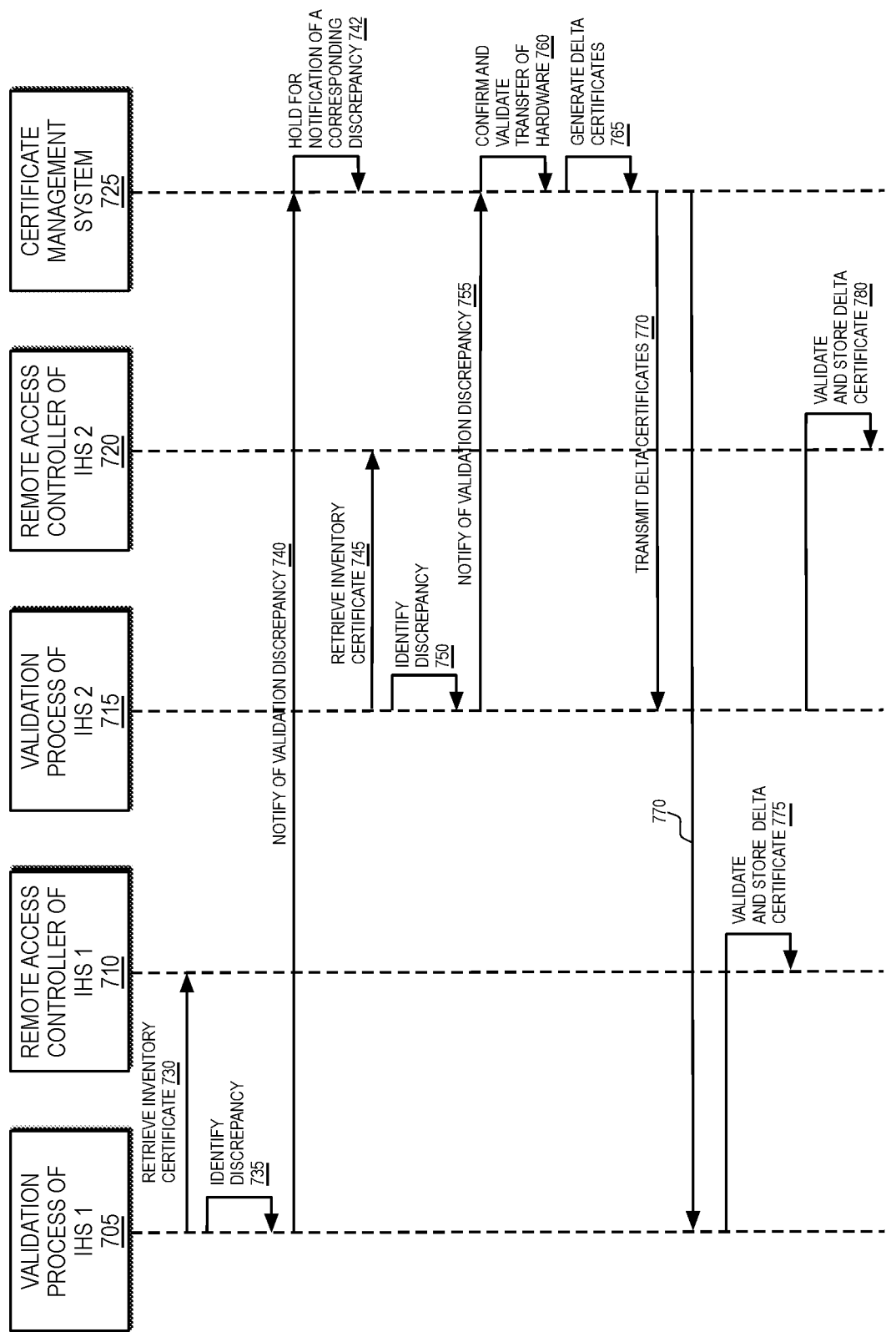
FIG. 7 is a swim lane diagram illustrating certain responsibilities of components of a system configured according to certain embodiments for the validation of the transfer of hardware components between different IHSs.

FIG. 7 is a swim lane diagram illustrating certain responsibilities of components of an IHS configured according to certain embodiments for the validation of the transfer of hardware components between different IHSs, such as within a datacenter. In FIG. 7, embodiments may begin, at 730, with the validation process 705 of an IHS retrieving the factory-provisioned inventory certificate from the remote access controller 710 of that IHS, as described in the validation procedures of FIGS. 5 and 6. As described, these validation procedures may be initiated each time an IHS is booted and/or based on various other detected conditions and requests. In some instances, the validation process 705 may be initiated by an administrator after completing service on the IHS, such after adding, removing or replacing hardware components from the IHS.

As described with regard to FIGS. 5 and 6, using the retrieved inventory certificate, at 735, the validation process 705 identifies any discrepancies between the detected hardware and the hardware specified in the factory-provisioned inventory certificate. In particular, the validation process 705 determines whether all of the factory-installed hardware is detected and whether any hardware other than factory-installed hardware has been detected. Upon detecting a discrepancy, in some embodiments, the validation process 705 may interface with the remote access controller 710 in order to query for additional information related to the discrepancy. For instance, the remote access controller 710 may report that a missing component that is identified in the inventory certificate as a factory-installed component but that was not detected, has been associated with faults or error conditions that indicate a possible component failure.

As indicated in FIG. 7, if any a discrepancy from the factory-installed hardware is detected, at 740, the validation process 705 notifies the certificate management system 725 of the discrepancy. In some embodiments, the notification of the discrepancy may also provide the certificate management system 725 with additional information related to the missing or unrecognized component that is causing the discrepancy, such as information provided by the remote access controller 710 specifying faults or errors related to a factory-installed hardware component that was not detected. In some embodiments, validation process 705 may halt further booting of the IHS upon reporting a detected discrepancy to the certificate management system 725. In some embodiments, validation process 705 may continue with various forms of restricted booting of the IHS, such as booting with any detected hardware that has not been successfully validated being quarantined. In some embodiments, the validation process 705 may boot while quarantining any subsystems for which the non-validated hardware is detected as being a subcomponent. For instance, in scenarios where a non-validated storage drive is detected by the validation process 705, embodiments may continue booting the IHS while quarantining any storage clusters, such as RAID clusters, and associated storage controllers 230a and SAS adapters 150, that the non-validated storage drive is a member of. As part of quarantining, these subsystems may maintained in an off state until a delta certificate is obtained that validates the detected discrepancy.

As described with regard to FIGS. 5 and 6, the certificate management system 725 may be a cloud based or other remote service, that may itself be implemented using IHSs such as described with regard to FIGS. 1 and 2, and that supports issuance of updates to the factory-provisioned inventory certificates used by IHSs to validated the authenticity of detected hardware. In particular, the certificate management system 725 generates delta certificates that may augment the factory-provisioned inventory certificate, where the delta certificate authenticates one or more modifications to the factory-installed hardware of the IHS. In embodiments, the certificate management system 725 may implement an API by which IHSs configured according to embodiments may report validation failures that result due to the detection of unrecognized, and thus non-validated, hardware, or due to missing hardware that is specified in the inventory certificate. Through such an API, the validation process 705 may report a detected hardware discrepancy, where the report may specify the missing hardware components and/or may provide available identifiers for detected hardware that is not validated by the factory-provisioned inventory certificate, nor by any delta certificates that have been previously issued. In some embodiments, the API may be used to report information related to the discrepancy, such as error conditions related to a missing component or such as prior record of an unrecognized component that has been detected but is not listed in the inventory certificate, thus indicating the unrecognized component has been previously installed in the IHS and previously managed by the remote access controller 710, which still retains records related to this prior management.

As described, in a data center environment, such validation discrepancies may be due to movement of hardware between IHSs, such as transfer of general-purpose storage drives 240a-n, network controllers 225, or power supply units 135 from one server IHS to another. Accordingly, the certificate management system 725 may be configured to delay further action on resolving the reported validation discrepancy on the basis that the discrepancy may be due to movement of hardware within a datacenter such that another IHS may report a corresponding discrepancy. As indicated in FIG. 7, at 742, the certificate management system 725 may hold for a configurable interval while monitoring for a corresponding validation failure from another IHS. This configurable interval may be set to an hour, twenty-four hours or any other interval deemed suitable by administrators performing hardware maintenance in the datacenter, where the interval would be selected to accommodate an expected duration in which administrators can complete a transfer of a hardware component from one IHS to another. In some embodiments, the interval may be selected based on any additional information reported with the discrepancy. For instance, a report of a missing hardware component having been associated with faults or errors by the remote access controller 710 may provide indication that a missing component will not be installed in another IHS such that a short interval of only a few minutes is sufficient to warrant prompt an administrator for confirmation of the removal of the missing hardware due to failure of the component.

In some instances, the certificate management system 725 may issue a prompt or other notification to administrators when a validation discrepancy has been reported by an IHS, but no corresponding discrepancy has been received from another IHS during the applicable interval. In some instances, a hardware component may be removed from an IHS without transferring it to another IHS, such as due to fault conditions or due to the hardware component no longer being supported. Accordingly, in some instance, a hardware discrepancy such as a missing hardware component may be reported by an IHS, but that hardware component will not be reported as a unrecognized hardware by another IHS. Accordingly, the prompt provided by embodiments may allow administrators to specify that the missing hardware has been removed from circulation and is not being transferred. This may serve to validate the authenticity of the removal of the hardware component such that the certificate management system 725 may issue a delta certificate for use by the IHS in validating this removal, and thus providing a capability for validating modifications to the hardware specified in the factory-provisioned inventory certificate.

While the certificate management system 725 is deferring action on the received discrepancy and is holding for notification of a corresponding validation discrepancy, as indicted in FIG. 7, at 745, a validation process 715 of a different IHS is initialized and requests the inventory certificate specifying its factory-installed hardware from the remote access controller 720 of that IHS. As described with regard to FIGS. 5 and 6, using the retrieved inventory certificate, at 750, the validation process 715 of the second IHS identifies any discrepancies between its detected hardware and the hardware specified in its factory-provisioned inventory certificate. In particular, the validation process 715 determines whether any of the factory-installed hardware is detected or whether any hardware other than factory-installed hardware has been detected. As indicated in FIG. 7, if any such discrepancy is detected, at 755, the validation process 715 notifies the certificate management system 725 of the discrepancy.

In embodiments, the certificate management system 725 maintains a listing of received discrepancy notifications that are regarded as active, and for which delta certificate generation remains pending. As described, the certificate management system 725 may hold received discrepancy notifications received from data center IHSs for a configurable interval while waiting for a corresponding discrepancy to be reported by another IHS within a datacenter, thus confirming movement of a hardware component within IHSs of a datacenter. Once these discrepancy notifications have been held as active for a duration in excess of the configured interval, the certificate management system 725 may seek manual validation of a reported discrepancy, as described above, and this discrepancy notification may then be removed from the list of active discrepancies maintained by the certificate management system 725.

Each received discrepancy notifications is thus evaluated by the certificate management system 725 against this listing of active discrepancy notifications in order to identify corresponding notifications that represent transfers of hardware between IHSs operating within the same datacenter. For instance, upon receiving notification from the validation process 705 of a first IHS of a validation failure resulting from a missing storage drive that was not detected by this IHS, despite this storage drive being specified in the inventory certificate as a factory-installed component. While this discrepancy notification remains active, all received notifications are evaluated for reports of the missing storage drive being detected by another IHS. If the certificate management system 725 receives a discrepancy notification from the validation process 715 of the second IHS that reports an unrecognized storage drive, the certificate management system 725 determines whether this unrecognized storage drive is the storage drive reported as missing by the validation process 705 of the first IHS.

In scenarios where a corresponding discrepancy notification is identified in the list of active discrepancies, at 760, the certificate management system 725 may confirm that the two reported discrepancy notifications correspond to movement of one or more hardware components between the IHSs reporting the discrepancies. For instance, the certificate management system 725 may compare unique identifiers specified in the factory-provisioned inventory certificate of the IHS reporting a missing component and identifiers provided by the IHS reporting a validation failure due to an unrecognized component. In some embodiments, the certificate management system 725 may confirm these two components are the same based on evaluation of a digital signature corresponding to firmware and/or other instructions that are ready to be loaded and run by the unrecognized hardware, where such signatures may be evaluated against signatures present in the factory-provisioned inventory certificate of the IHS reporting a missing hardware component. In this manner, the information in the factory-provisioned inventory certificate of a first IHS may be used in the validation of hardware detected by a second IHS, in particular validation of factory-installed hardware of the first IHS that has been transferred to the second IHS.

If such evaluation confirms the movement of hardware between IHSs that are configured according to embodiments, at 765, the certificate management system 725 generates delta certificates for each of the IHSs that have reported corresponding discrepancy notifications. In some embodiments, the certificate management system 725 may operate a certificate authority that may be the same as or related to the factory certificate authority 315 utilized in the generation of the factory-provisioned inventory certificate. In other embodiments, the certificate management system 725 may rely on another trusted certificate authority for generation of delta certificates that extend the validations provided by a factory-provisioned inventory certificate. In generating the delta certificates, the certificate management system 725 may generate a digital signature corresponding to the updated hardware inventory of the IHS. In some embodiments, the digital signature included in a delta certificate may be generated based on the complete hardware inventory of the IHS, thus providing some level of redundancy relative to the factory-provisioned inventory certificate. In some embodiments, the digital signature included in a delta certificate may be generated based only on the modified hardware, such as a digital signature identifying a specifies storage drives, which corresponds to an unrecognized storage drive reported by an IHS in its discrepancy notification. In some embodiments, the delta certificates generated by the certificate management system 725 may denote that the modifications validated by a specific delta certificate corresponds to a hardware transfer within a datacenter, thus supporting less stringent and rapid validation of certain hardware discrepancies that pose low levels of risk. In some embodiments, when validating detected hardware using a delta certificate that corresponds to a transfer of hardware within the datacenter, validation processes 705, 715 may implement modified procedures for validation of such delta certificates, such as validating only that the delta certificate is a valid extension of the factory-provisioned inventory certificate.

These generated delta certificates may then be used to validate authorized modifications to the factory-installed hardware of the IHS, specifically the transfer of hardware within a datacenter. In embodiments, such delta certificates may be generated using the cryptographic capabilities available to the certificate management system 725. However, in some embodiments, the certificate management system 725 may be configured to defer generating any delta certificates for an IHS until that IHS has reported an initial validation that indicates the IHS has been received with only authentic factory-installed hardware. In this manner, delta certificate generation is precluded until the IHS has been validated to have been initially booted using only factory-installed hardware identified in the original inventory certificate of the IHS. In this manner, validated transfer of hardware between datacenter IHSs is supported, but only after establishing that the involved IHSs have been received and initialized using only the factory-installed hardware.

Once delta certificates have been generated by the certificate management system 725, these delta certificates are transmitted to respective validation process 705 and 715 of the IHSs that reported the corresponding discrepancy notifications. At 775 and 780, the respective validation process 705 and 715 validate and store the delta certificates received from the certificate management system 725. As with the original inventory certificates, the respective remote access controllers 710 and 720 may store the generated delta certificate to a protected memory device or other protected persistent data storage. In some embodiments, the respective remote access controllers 710 and 720 may validate received delta certificates, such as through confirmation that the delta certificate has been derived from the factory-provisioned inventory certificate maintained by the remote access controller, and such as through challenges issued to the certificate authority that generated the delta certificates.

With the delta certificates generated and stored for use by the IHSs, an administrator may be notified that the transfer of hardware between data center IHSs has been detected and that delta certificates for validating the authenticity of these modifications has been generated and stored. At this point, the IHSs reporting the corresponding discrepancy notifications are ready for use, now using the hardware modifications resulting from the hardware transfer.

In such instances, re-validation of the hardware of the IHS may proceed according to the procedures of FIGS. 5 and 6, with any identified discrepancies from the factory-installed inventory evaluated for authenticity using the stored delta certificate. As additional transfers of hardware within a datacenter are made, delta certificates may be invalidated and/or additional delta certificates may be generated. In this manner, successive rounds of hardware transfers may be used in adapting an IHS for specific computing tasks.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system comprising
    a first IHS (Information Handling System) configured to:
        validate detected hardware of the first IHS as factory-installed hardware based on an inventory specified in a first factory-provisioned inventory certificate stored to a memory of the first IHS; and
        notify a certificate management system when the validation identifies a discrepancy in the detected hardware of the first IHS from the factory-installed hardware; and
    a second IHS configured to:
        validate detected hardware of the second IHS as factory-installed hardware based on an inventory specified in a second factory-provisioned inventory certificate stored to a memory of the second IHS; and
        notify the certificate management system when the validation identifies a discrepancy in the detected hardware of the second IHS from the factory-installed hardware; and
    the certificate management system configured to:
        detect when the discrepancy in the detected hardware of the first IHS and the discrepancy in the detected hardware of the second IHS corresponds to a transfer of hardware between the first IHS and the second IHS; and
        when the transfer of hardware is determined, authorize generation of delta certificates for validation of the transfer between the first IHS and the second IHS.

2. The system of claim 1, wherein the discrepancy in the detected hardware of the first IHS from the factory-installed hardware comprises a missing factory-installed hardware component of the first IHS that was not detected.

3. The system of claim 2, wherein the discrepancy in the detected hardware of the second IHS from the factory-installed hardware comprises an unrecognized hardware component that is not a factory-installed hardware component of the second IHS.

4. The system of claim 3, wherein the detection of discrepancies as corresponding to the transfer of hardware between the first IHS and the second IHS comprises determining the missing factory-installed hardware component of the first IHS is the unrecognized hardware component that is not a factory-installed hardware component of the second IHS.

5. The system of claim 1, wherein the certificate management system is configured to block generation of the delta certificates without determining the discrepancy in the detected hardware of the first IHS and the discrepancy in the detected hardware of the second IHS corresponds to the transfer of hardware between the first IHS and the second IHS.

6. The system of claim 1, wherein the first IHS is configured to prevent further booting of the IHS upon notifying the certificate management system of the discrepancy in the detected hardware of the first IHS until a delta certificate is generated for use in validating this discrepancy in the detected hardware of the first IHS.

7. The system of claim 1, wherein the first factory-provisioned inventory certificate is stored to a persistent memory of the first IHS during the factory-provisioning of the first IHS and wherein the second factory-provisioned inventory certificate is stored to a persistent memory of the second IHS during the factory-provisioning of the second IHS.

8. The system of claim 1, wherein the certificate management system is further configured to defer action on the notification of the discrepancy in the detected hardware of the first IHS for a predetermined interval.

9. The system of claim 8, wherein, after the predetermined interval, the certificate management system requests authorization from an administrator for the notified discrepancy in the detected hardware of the first IHS, and wherein the certificate management system generates a delta certificate for validating the discrepancy in the detected hardware of the first IHS.

10. The system of claim 8, wherein during the predetermined interval, the certificate management monitors for a notification of a corresponding discrepancy reported by another IHS.

11. A method for validating a transfer of a hardware component from a first IHS (Information Handling System) to a second IHS, the method comprising:
    validating detected hardware of the first IHS as factory-installed hardware based on an inventory specified in a first factory-provisioned inventory certificate stored to a memory of the first IHS;
    notifying a certificate management system when the validation identifies a discrepancy in the detected hardware of the first IHS from the factory-installed hardware;
    validating detected hardware of the second IHS as factory-installed hardware based on an inventory specified in a second factory-provisioned inventory certificate stored to a memory of the second IHS;
    notifying the certificate management system when the validation identifies a discrepancy in the detected hardware of the second IHS from the factory-installed hardware;

detecting, by the certificate management system, when the discrepancy in the detected hardware of the first IHS and the discrepancy in the detected hardware of the second IHS corresponds to a transfer of hardware between the first IHS and the second IHS; and when the transfer of hardware is determined, authorizing, by the certificate management system, generation of delta certificates for validation of the transfer between the first IHS and the second IHS.

12. The method of claim 11, wherein the discrepancy in the detected hardware of the first IHS from the factory-installed hardware comprises a missing factory-installed hardware component of the first IHS that was not detected.

13. The method of claim 12, wherein the discrepancy in the detected hardware of the second IHS from the factory-installed hardware comprises an unrecognized hardware component that is not a factory-installed hardware component of the second IHS.

14. The method of claim 13, wherein the detection of discrepancies as corresponding to the transfer of hardware between the first IHS and the second IHS comprises determining the missing factory-installed hardware component of the first IHS is the unrecognized hardware component that is not a factory-installed hardware component of the second IHS.

15. The method of claim 11, further comprising deferring, by the certificate management system, further action on the notification of the discrepancy in the detected hardware of the first IHS for a predetermined interval.

16. A computer-readable storage device having instructions stored thereon for validated transfer of a hardware component from a first IHS (Information Handling System) to a second IHS, wherein execution of the instructions by one or more processors of the IHS causes the one or more processors to:

receive a notification of a first discrepancy in the detected hardware of the first IHS from factory-installed hardware of the first IHS, wherein the first discrepancy is detected based on an inventory of factory-installed hardware specified in a first factory-provisioned inventory certificate stored to a memory of the first IHS;

receive a notification of a second discrepancy in the detected hardware of the second IHS from factory-installed hardware of the second IHS, wherein the second discrepancy is detected based on an inventory of factory-installed hardware specified in a second factory-provisioned inventory certificate stored to a memory of the second IHS;

detect when the first discrepancy in the detected hardware of the first IHS and the second discrepancy in the detected hardware of the second IHS corresponds to a transfer of hardware between the first IHS and the second IHS; and when the transfer of hardware is determined, authorize generation of delta certificates for validation of the transfer between the first IHS and the second IHS.

17. The computer-readable storage device of claim 16, wherein the first discrepancy in the detected hardware of the first IHS from the factory-installed hardware comprises a missing factory-installed hardware component of the first IHS that was not detected.

18. The computer-readable storage device of claim 17, wherein the second discrepancy in the detected hardware of the second IHS from the factory-installed hardware comprises an unrecognized hardware component that is not a factory-installed hardware component of the second IHS.

19. The computer-readable storage device of claim 18, wherein the detection of discrepancies as corresponding to the transfer of hardware between the first IHS and the second IHS comprises determining the missing factory-installed hardware component of the first IHS is the unrecognized hardware component that is not a factory-installed hardware component of the second IHS.

20. The computer-readable storage device of claim 16, wherein execution of the instructions by one or more processors of the IHS causes the one or more processors to defer further action on the notification of the discrepancy in the detected hardware of the first IHS for a predetermined interval.

* * * * *